P. BERG.
THREADLESS HOSE COUPLING.
APPLICATION FILED APR. 18, 1913.
1,080,675.
Patented Dec. 9, 1913.
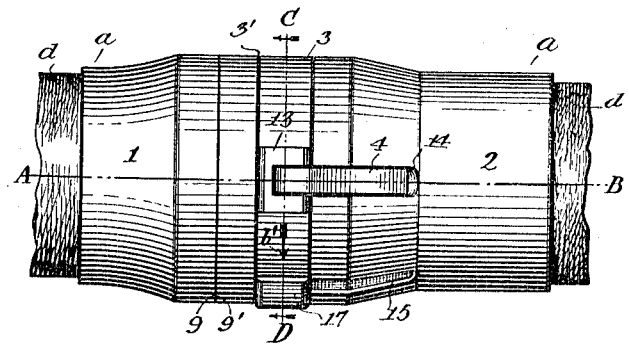
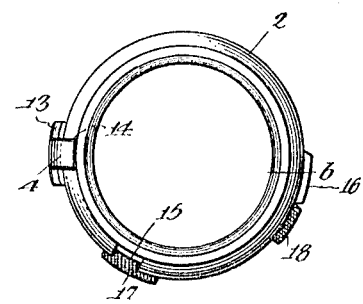
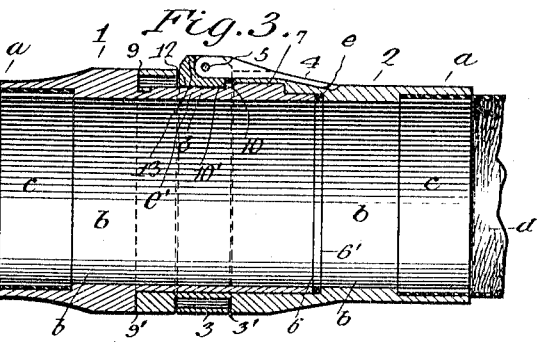
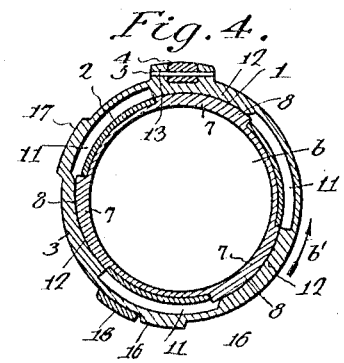
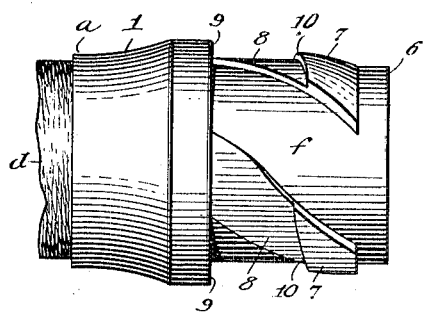
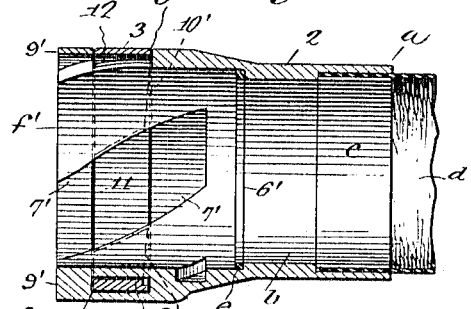
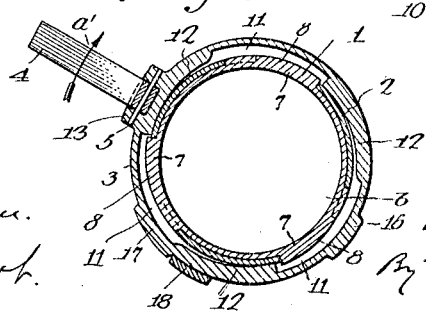
Witnesses:
Inventor:
Peter Berg
Attorney.

UNITED STATES PATENT OFFICE.

PETER BERG, OF ENDERLIN, NORTH DAKOTA.

THREADLESS HOSE-COUPLING.

1,080,675.            Specification of Letters Patent.           Patented Dec. 9, 1913.

Application filed April 18, 1913. Serial No. 762,077.

*To all whom it may concern:*

Be it known that I, PETER BERG, a citizen of the United States of America, and a resident of Enderlin, in the State of North Dakota, have invented a new and useful Improvement in Threadless Hose-Couplings, of which the following is a specification.

This invention relates to those couplings for flexible hose which are constructed without screw threads, and so as to be tightened or loosened by a part turn, and consequently more rapidly than screw couplings.

The present invention consists in certain novel combinations of parts, and in an improved threadless hose coupling embodying said combinations or either of them, as hereinafter particularly described and claimed.

The leading objects of this invention are to render such threadless hose couplings safe against liability to come apart accidentally, and at the same time to adapt the coupling members to be separated by an endwise pull when unlocked.

Other objects will be set forth in the general description, which follows.

A sheet of drawings accompanies this specification, as part thereof.

Figure 1 is an elevation of the improved threadless hose coupling attached to adjoining hose sections and locked; Fig. 2 is an end view of the coupling proper projected from Fig. 1; Fig. 3 represents a longitudinal section on the line A—B, Fig. 1; Fig. 4 represents a cross section on the line C—D, Fig. 1; Fig. 5 represents a cross section through the unlocked coupling; and Figs. 6 and 7 are respectively an elevation and a longitudinal section of the respective members, uncoupled.

Like reference characters refer to like parts in all the figures.

The spigot member 1 and the socket member 2 of the improved threadless hose coupling have in common an attaching end, $a$, which is preferably and conveniently a sleeve end, and a shouldered bore, $b$; the latter accommodating an expanded internal metallic ring, $c$, by which the corresponding hose end, $d$, is inseparably attached to the coupling member. Apart from said internal ring $c$, or its equivalent, the spigot member 1 may be a single casting of a suitable metal or alloy. The metallic socket member 2 carries a rotatable locking ring, 3, provided with a folding wrench or key lever 4 and its pivot 5; and the body of the socket member may be composed of a plurality of parts united in a customary way. The extremity 6 of the spigot member 1 makes a tight joint with a gasket $e$ supported by a matching shoulder $6'$ within the socket member 2; and the periphery of the spigot end, $f$, Fig. 6, is provided with a plurality of short spiral projections 7 having reduced portions 8, Fig. 6, adjoining its main shoulder 9, and locking shoulders 10, Fig. 6, inclined with reference to said main shoulder. The extremity $9'$ of the socket member 2 contacts with said main shoulder 9 of the spigot member 1 in the locked couplings, Figs. 1–4, or with an interposed gasket, in a customary way. The wall of its main socket $f'$ matching said spigot end $f$ is provided with spiral recesses $7'$ matching said spiral projections 7. Interspaces 11 between internal locking projections 12 on the ring 3 coincide with said recesses $7'$ when the coupling is unlocked and the spigot member is withdrawn, as shown in Figs. 5 and 7; and said locking projections 12 have inclines $10'$, matching the inclined shoulders 10 of said projections 7 when the members 1 and 2 are coupled, and interacting therewith in the tightening and locking operation.

The locking ring 3 has a circumferential part turn in its recessed seat $e'$, and with reference thereto is provided with said folding lever 4, which is hinged by its said pivot 5 within a recessed external projection 13 on the ring, and accommodated in its folded position when the coupling is locked by a groove 14 and when the members are unlocked and uncoupled by a groove 15; these grooves being formed in the body of the socket member as shown in Figs. 1 and 2. The locking ring 3 is preferably further provided with a pair of external projections, 16, 17, and the body of the socket member 2 with a bridge-shaped stop 18; the latter crossing the ring's raceway $3'$ and contacting with said projections 16, 17 when the coupling is locked and when it is unlocked, respectively.

When the spigot $f$ is thrust endwise into the socket $f'$, the interaction of the spiral projections 7 and spiral recesses $7'$ gives the spigot a short twist and facilitates holding the coupling members a moment, during which moment the key lever 4 is pulled out of the groove 15 to its position represented in Fig. 5, and the ring 3 is thereby turned in the direction represented by the arrows $a'$, Fig. 5, so as to cause the inclines 10' of the projections 12 to interact with the inclined shoulders 10 of the spiral projections 7, which tightens the joints at 6, 6' and 9, 9', and locks the coupling. The key lever 4 is then folded into the locked-position groove 14.

In the unlocking and uncoupling operation, the key lever 4 is lifted out of said groove 14, and the ring 3 is turned thereby in the direction represented by the arrows $b'$. This brings the interspaces 11 of the ring into alinement with the spiral projections 7 as in Fig. 5 and permits the spigot member 1 to escape endwise from the socket member 2. Before releasing the socket member, the key lever 3 is conveniently folded into said groove 15 so as to be out of the way; which also keeps the ring in position for the next coupling operation. It will be obvious that in some cases the projections 16, 17 and said stop 18 may be omitted or changed as to form; a ground joint may be substituted for the gasket joint at 6, 6'; and other like modifications will suggest themselves to those skilled in the art.

Having thus described said improvement, I claim as my invention, and desire to patent under this specification:

1. An improved threadless hose coupling having, in combination, a spigot member constructed with a circumferential main shoulder, a plurality of peripheral spiral projections extending toward said shoulder and constructed with shoulders inclined with reference to said main shoulder; and a socket member having spiral recesses in its socket wall fitted to said spiral projections, and provided with a rotatable locking ring having internal projections forming inclines matching said inclined shoulders and interacting therewith to tighten and lock the coupling.

2. An improved threadless hose coupling having, in combination, a spigot member constructed with a circumferential main shoulder, a plurality of peripheral spiral projections extending toward said shoulder and constructed with shoulders inclined with reference to said main shoulder; and a socket member having spiral recesses in its socket wall fitted to said spiral projections, and provided with a rotatable locking ring having internal projections forming inclines matching said inclined shoulders and interacting therewith to tighten and lock the coupling; said ring being provided with a foldable key lever, and the body of said socket member having a groove to admit said lever in its folded position when the coupling is locked.

3. An improved threadless hose coupling having, in combination, a spigot member constructed with a circumferential main shoulder, a plurality of peripheral spiral projections extending toward said shoulder and constructed with shoulders inclined with reference to said main shoulder; and a socket member having spiral recesses in its socket wall fitted to said spiral projections, and provided with a rotatable locking ring having internal projections forming inclines matching said inclined shoulders and interacting therewith to tighten and lock the coupling; said ring being provided with a foldable key lever, and the body of said socket member having a pair of grooves to admit the folded lever when the coupling is locked and when it is unlocked respectively.

4. An improved threadless hose coupling having, in combination, a spigot member and a socket member, each having a hose attaching end, and provided respectively with the members of a tight joint at the inner extremity of said spigot member, and with the members of an outer joint at the extremity of said socket member; said spigot member having a plurality of peripheral spiral projections extending toward said outer joint and constructed with reduced portions and shoulders, the latter inclined with reference to said outer joint; and said socket member having spiral recesses in its socket wall fitted to said spiral projections, and provided with a rotatable locking ring having internal locking projections forming inclines matching said inclined shoulders, and a pair of external stop-engaging projections; the body of said socket member being further provided with a stop arranged to contact with one of said external projections when the coupling is locked and with the other when the coupling is unlocked, substantially as hereinbefore specified.

PETER BERG.

Witnesses:
C. E. BOUGET,
FRED UNDERWOOD.

---

Copies of this patent may be obtained for five cents each, by addressing the "Commissioner of Patents, Washington, D. C."